(12) United States Patent
Lee et al.

(10) Patent No.: US 10,177,913 B2
(45) Date of Patent: Jan. 8, 2019

(54) SEMICONDUCTOR DEVICES AND METHODS OF PROTECTING DATA OF CHANNELS IN THE SAME

(71) Applicant: Samsung Electronics Co., Ltd., Suwon-si, Gyeonggi-do (KR)

(72) Inventors: Heon Soo Lee, Hwaseong-si (KR); Yong Ki Lee, Yongin-Si (KR); Sang Hyun Park, Seoul (KR); Mi Jung Noh, Yongin-si (KR); Hong Mook Choi, Bucheon-si (KR); Dong Jin Park, Seoul (KR); Woo Hyung Chun, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 111 days.

(21) Appl. No.: 14/713,120

(22) Filed: May 15, 2015

(65) Prior Publication Data

US 2015/0372816 A1    Dec. 24, 2015

(30) Foreign Application Priority Data

Jun. 19, 2014  (KR) .................. 10-2014-0075146

(51) Int. Cl.
   *H04L 9/14* (2006.01)
   *G06F 13/42* (2006.01)
   (Continued)

(52) U.S. Cl.
   CPC ............ *H04L 9/14* (2013.01); *G06F 13/4282* (2013.01); *G06F 21/606* (2013.01); *G06F 21/84* (2013.01);
   (Continued)

(58) Field of Classification Search
   CPC .................... H04L 19/14; H04L 9/14
   (Continued)

(56) References Cited

U.S. PATENT DOCUMENTS 5,249,232 A    9/1993   Erbes et al.
5,596,736 A *  1/1997   Kerns .................. G06F 3/0601
                                                    711/100
(Continued)

FOREIGN PATENT DOCUMENTS

EP    1457859 A2    9/2004
EP    1802030 A1    6/2007
(Continued)

*Primary Examiner* — Matthew T Henning
(74) *Attorney, Agent, or Firm* — Harness, Dickey & Pierce, P.L.C.

(57) ABSTRACT

A semiconductor device may include: a bus; first and second function modules configured to communicate via the bus; a first encryption module configured to encrypt first data output from the first function module using a first encryption key to generate first encrypted data; and/or a second encryption module configured to decrypt the first encrypted data using the first encryption key, to output the decrypted first data to the second function module, and to encrypt second data output from the second function module using a second encryption key to generate second encrypted data. A semiconductor device may include: a bus; first and second modules configured to communicate via the bus; and/or an encryption module configured to use different encryption policies for first data, which is output from the first module and stored in a memory, and second data, which is output from the second module and stored in the memory.

12 Claims, 15 Drawing Sheets

(51) Int. Cl.
  *G09C 1/00* (2006.01)
  *H04L 9/08* (2006.01)
  *G06F 21/60* (2013.01)
  *G06F 21/84* (2013.01)
  *G06F 21/85* (2013.01)

(52) U.S. Cl.
  CPC ............... *G06F 21/85* (2013.01); *G09C 1/00* (2013.01); *H04L 9/088* (2013.01); *H04L 2209/12* (2013.01)

(58) Field of Classification Search
  USPC .......................................................... 713/189
  See application file for complete search history.

(56) References Cited

U.S. PATENT DOCUMENTS

| | | | | |
|---|---|---|---|---|
| 5,995,623 | A * | 11/1999 | Kawano | G06F 21/10 380/277 |
| 6,195,730 | B1 * | 2/2001 | West | G06F 12/0875 710/52 |
| 6,250,548 | B1 * | 6/2001 | McClure | G07C 13/00 235/51 |
| 7,058,179 | B1 * | 6/2006 | Maruo | H04N 7/1675 348/E5.004 |
| 7,269,742 | B2 | 9/2007 | Gammel et al. | |
| 7,383,462 | B2 * | 6/2008 | Osaki | G06F 11/1464 705/50 |
| 7,657,754 | B2 | 2/2010 | Chambers et al. | |
| 7,979,720 | B2 | 7/2011 | Klein | |
| 8,010,802 | B2 | 8/2011 | Kang et al. | |
| 8,081,761 | B2 | 12/2011 | Yushiya | |
| 8,578,156 | B2 | 11/2013 | Goto | |
| 2002/0141577 | A1 | 10/2002 | Ripley et al. | |
| 2003/0105967 | A1 * | 6/2003 | Nam | G06F 12/1408 713/189 |
| 2003/0233494 | A1 * | 12/2003 | Ghosh | G06F 3/061 710/1 |
| 2004/0143748 | A1 * | 7/2004 | Yamaguchi | G06F 12/0802 713/193 |
| 2005/0114659 | A1 * | 5/2005 | Klein | G06F 21/80 713/165 |
| 2005/0232415 | A1 | 10/2005 | Little et al. | |
| 2006/0156034 | A1 * | 7/2006 | Hamaguchi | G06F 21/85 713/193 |
| 2007/0223688 | A1 * | 9/2007 | Le Quere | H04L 9/14 380/28 |
| 2007/0234072 | A1 * | 10/2007 | Kudelski | G06F 21/53 713/190 |
| 2008/0155273 | A1 | 6/2008 | Conti | |
| 2008/0189560 | A1 * | 8/2008 | Case | G06F 12/1458 713/193 |
| 2008/0279371 | A1 * | 11/2008 | Lee | H04L 9/065 380/42 |
| 2010/0188975 | A1 * | 7/2010 | Raleigh | G06Q 10/06375 370/230.1 |
| 2010/0191982 | A1 * | 7/2010 | Goto | G06F 21/72 713/192 |
| 2010/0287374 | A1 * | 11/2010 | Roy | G06F 21/70 713/171 |
| 2011/0023027 | A1 * | 1/2011 | Kegel | G06F 12/10 718/1 |
| 2012/0096281 | A1 * | 4/2012 | Eszenyi | G06F 21/602 713/189 |
| 2013/0145177 | A1 * | 6/2013 | Cordella | G06F 12/1408 713/193 |
| 2013/0212352 | A1 * | 8/2013 | Anderson | G06F 9/3869 712/1 |
| 2014/0047549 | A1 * | 2/2014 | Bostley, III | G06F 21/60 726/26 |
| 2014/0310536 | A1 * | 10/2014 | Shacham | G06F 21/78 713/193 |
| 2016/0226661 | A1 * | 8/2016 | Keidar | G06F 21/74 |

FOREIGN PATENT DOCUMENTS

| | | |
|---|---|---|
| JP | 2004104181 A | 4/2004 |
| JP | 2007281994 A | 10/2007 |

* cited by examiner

FIG. 6A

Read Channel Bus ID Table

| ID | Policy | Key |
|---|---|---|
| 3 | Algorithm R1 | A |
| 5 | Non Encryption | — |
| 7 | Algorithm R2 | B |

FIG. 6B

Write Channel Bus ID Table

| ID | Policy | Key |
|---|---|---|
| 3 | — | — |
| 5 | Non Encryption | — |
| 7 | Algorithm R2 | B |

SEMICONDUCTOR DEVICES AND METHODS OF PROTECTING DATA OF CHANNELS IN THE SAME

CROSS-REFERENCE TO RELATED APPLICATION(S)

This application claims priority from Korean Patent Application No. 10-2014-0075146, filed on Jun. 19, 2014, in the Korean Intellectual Property Office (KIPO), the entire contents of which are incorporated herein by reference.

BACKGROUND

1. Field

Some example embodiments of the inventive concepts may relate generally to semiconductor devices. Some example embodiments of the inventive concepts may relate generally to methods of protecting data of channels in semiconductor devices and apparatuses for performing the methods.

2. Description of Related Art

Recent semiconductor devices may include many modules with various functions. The modules may sometimes be connected directly with each other to communicate data with each other, but they usually communicate data with one another via a common bus and memory. In other words, a communication channel within a semiconductor device may usually be formed through a bus and memory. Data transferred through this communication channel may not be coded and thus might be leaked out by probing a memory interface when memory is outside a semiconductor device and by hacking a third module (mainly a processor) other than modules exchanging data and reading memory through the third module. Therefore, it may be desired to prevent data from being leaked when it is unwanted by protecting communication channels in a semiconductor device.

SUMMARY

Some example embodiments of the inventive concepts may provide methods of protecting data of channels of semiconductor devices from being leaked by, for example, protecting each channel from the other channels in a semiconductor device.

Some example embodiments of the inventive concepts may provide apparatuses for protecting data of channels of semiconductor devices from being leaked by, for example, protecting each channel from the other channels in a semiconductor device.

In some example embodiments, a semiconductor device may comprise: a bus; first and second function modules configured to communicate data via the bus; a first encryption module configured to encrypt first data output from the first function module using a first encryption key to generate first encrypted data; and/or a second encryption module configured to decrypt the first encrypted data using the first encryption key, to output the decrypted first data to the second function module, and to encrypt second data output from the second function module using a second encryption key to generate second encrypted data. The second encryption key may be different from the first encryption key.

In some example embodiments, the semiconductor device may further comprise: a third function module; and/or a third encryption module configured to decrypt the second encrypted data using the second encryption key and to output the decrypted second data to the third function module.

In some example embodiments, an external memory of the semiconductor device may be configured to store the first encrypted data output from the first encryption module and the second encrypted data output from the second encryption module.

In some example embodiments, the third encryption module may be configured to encrypt third data output from the third function module using a third encryption key, different from the first and second encryption keys, to generate third encrypted data.

In some example embodiments, the first and second encryption keys may be configured to be set and changed by an operating system (OS) run in the semiconductor device.

In some example embodiments, the first, second, and third encryption modules may be connected between the bus and the first, second, and third function modules.

In some example embodiments, at least one module among the first, second, and third encryption modules may comprise 'm' sub-encryption modules configured to encrypt n-bit data, where 'm' and 'n' are integers greater than or equal to 2. The at least one module may be configured to encrypt data of greater than or equal to 'n' bits and less than or equal to 'm*n' bits.

In some example embodiments, a semiconductor device may comprise: a bus; first and second modules configured to communicate data via the bus; and/or an encryption module configured to respectively use different encryption policies for first data, which is output from the first module and stored in a memory, and second data, which is output from the second module and stored in the memory.

In some example embodiments, the first and second modules may have first and second bus identifications (IDs), respectively, which are different from each other. The encryption module may comprise a key storage configured to store the different encryption policies respectively corresponding to the first and second bus IDs.

In some example embodiments, the key storage may be further configured to store a first encryption key corresponding to the first bus ID and a second encryption key corresponding to the second bus ID. The encryption module may be further configured to encrypt the first data output from the first module using the first encryption key to generate first encrypted data, and may be further configured to encrypt the second data output from the second module using the second encryption key, different from the first encryption key, to generate second encrypted data.

In some example embodiments, the key storage may be further configured to store an identifier of a first encryption algorithm corresponding to the first bus ID and an identifier of a second encryption algorithm corresponding to the second bus ID. The encryption module may comprise: a first encryption/decryption component configured to encrypt the first data using the first encryption algorithm and to decrypt the encrypted first data using the first encryption algorithm; and/or a second encryption/decryption component configured to encrypt the second data using the second encryption algorithm and to decrypt the encrypted second data using the second encryption algorithm.

In some example embodiments, the semiconductor device may further comprise: a third module having a third bus ID. The encryption module may be further configured to store in the memory third data output from the third module without encrypting the third data.

In some example embodiments, the key storage may further comprise: a read channel key storage configured to store encryption policies for respective bus IDs with respect to a read channel of the first module and a read channel of the second module; and/or a write channel key storage configured to store the encryption policies for the respective bus IDs with respect to a write channel of the first module and a write channel of the second module.

In some example embodiments, the encryption module may comprise 'm' sub-encryption modules configured to encrypt data in units of 'n' bits, where 'm' is an integer greater than or equal to 1 and 'n' is an integer greater than or equal to 2. The encryption module may be configured to encrypt data in units greater than or equal to 'n' bits and less than or equal to 'm*n' bits.

In some example embodiments, the semiconductor device may be a system on chip (SoC).

In some example embodiments, a semiconductor device, may comprise: a first module configured to output first data; a second module configured to output second data; and/or an encryption module configured to encrypt the first data using a first encryption key to generate first encrypted data and configured to encrypt the second data using a second encryption key to generate second encrypted data. The second encryption key may be different from the first encryption key.

In some example embodiments, the encryption module may comprise: a first sub-encryption module configured to encrypt the first data using the first encryption key to generate the first encrypted data; and/or a second sub-encryption module configured to encrypt the second data using the second encryption key to generate the second encrypted data.

In some example embodiments, the encryption module may be further configured to decrypt the first encrypted data using the first encryption key to recover the first data. The encryption module may be further configured to decrypt the second encrypted data using the second encryption key to recover the second data.

In some example embodiments, the encryption module may comprise: a first sub-encryption module configured to decrypt the first encrypted data using the first encryption key to recover the first data; and/or a second sub-encryption module configured to decrypt the second encrypted data using the second encryption key to recover the second data.

In some example embodiments, the first and second encrypted data may be stored in memory external to the semiconductor device.

BRIEF DESCRIPTION OF THE DRAWINGS

The above and/or other aspects and advantages will become more apparent and more readily appreciated from the following detailed description of example embodiments, taken in conjunction with the accompanying drawings, in which:

FIG. 6A is a table showing an encryption policy per bus identification (ID) with respect to a read channel in a semiconductor device illustrated in FIG. 5;

FIG. 6B is a table showing an encryption policy per bus ID with respect to a write channel in the semiconductor device illustrated in FIG. 5;

DETAILED DESCRIPTION

Figure 1:
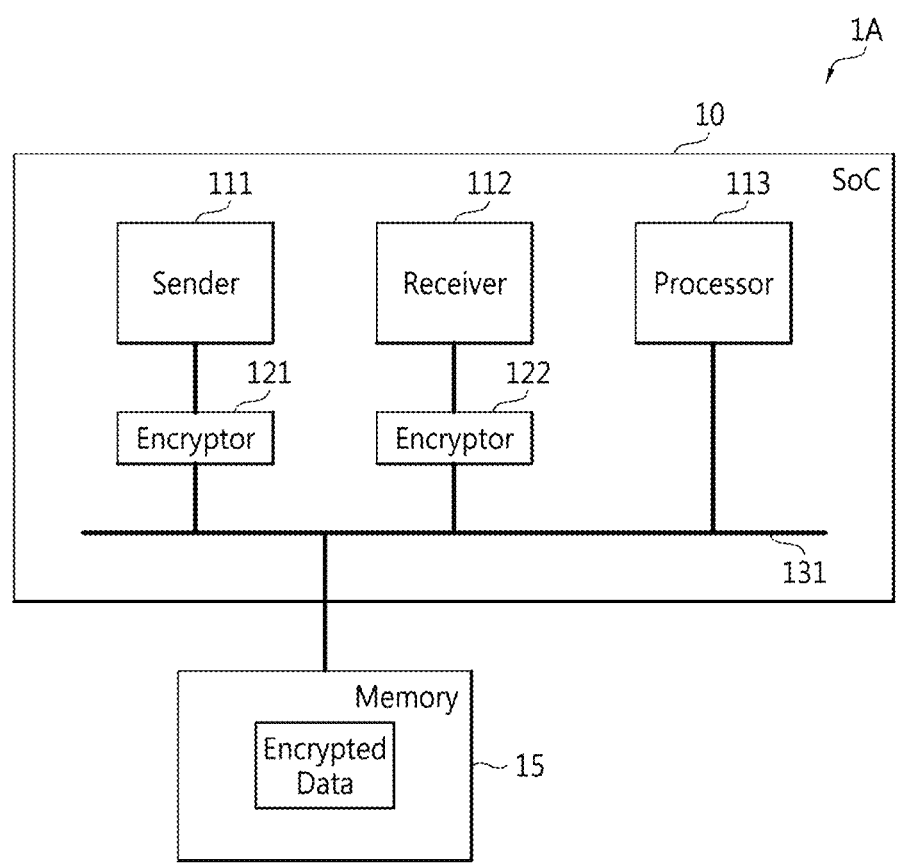
FIG. 1 is a structural block diagram of an electronic system according to some example embodiments of the inventive concepts.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a structural block diagram of an electronic system 1A according to some example embodiments of the inventive concepts. The electronic system 1A includes a semiconductor device 10 and an external memory 15.

The semiconductor device 10 may be implemented as a system on chip (SoC). The semiconductor device 10 includes first through third function modules 111, 112, and 113; first and second encryption modules 121 and 122; and a bus 131.

The first through third function modules 111 through 113 may communicate data with one another through the bus 131. Each of the first through third function modules 111 through 113 may be a module, such as a central processing unit (CPU), a graphics processing unit (GPU), a memory controller, a standard encryption module, a coder-decoder (codec), a scaler, a post processor, a display controller, a television (TV) interface module, a graphics engine, or an image signal processor, included in a SoC.

In the example embodiments illustrated in FIG. 1, the first function module 111 transmits data to the second function module 112 through a first channel (not shown). The first channel is a path through which data is transmitted from the first function module 111 to the second function module 112. The first channel may be formed of the bus 131 and the external memory 15.

The first function module 111 generates first data and stores it in the external memory 15. The first data is data that is transmitted from the first function module 111 to the second function module 112. In some example embodiments, the first data is transmitted from the first function module 111 to the second function module 112 not directly but via the bus 131 and the external memory 15. The first data is not raw data that is not encrypted, but it is encrypted by the first encryption module when transmitted as data, and then decrypted by the second encryption module 122 before being received by the second function module 112.

Each of encryption modules referred to as an "encryptor" in the drawings may perform both encryption and decryption in some example embodiments. It may perform only either encryption or decryption in some example embodiments.

The first encryption module 121 encrypts first data transmitted from the first function module 111 using a first encryption key (i.e., key A) to generate first encrypted data. The first encrypted data is stored in the external memory 15 through the bus 131.

The second function module 112 reads the first encrypted data from the external memory 15. At this time, the first encrypted data read from the external memory 15 is input first to the second encryption module 122 through the bus 131. The second encryption module 122 decrypts the first encrypted data using the first encryption key (i.e., key A), and outputs original data (i.e., the first data) to the second function module 112. As a result, the second function module 112 receives the first data that has originally been generated by the first function module 111.

The third function module 113 is not provided with an encryption module with the first encryption key. Accordingly, when the third function module 113 reads the first encrypted data from the external memory 15, the first encrypted data is not decrypted to the original data.

The bus 131 may be a multilayer bus. The bus 131 may be implemented as an advanced high-performance bus (AHB) or an Advanced eXtensible Interface (AXI) bus in some example embodiments, but the inventive concepts are not restricted to these example embodiments.

As described above, the first and second encryption modules 121 and 122 are provided in bus interface of the first and second function modules 111 and 112, respectively, which communicate data with each other. In other words, data is encrypted before transmitted to the bus 131 and decrypted when received from the bus 131. As a result, effective probing should not be possible in the memory interface, and the third function module 113 in the semiconductor device 10 cannot have raw data.

The first and second encryption modules 121 and 122 may be formed separated from the first and second function modules 111 and 112, respectively. In some example embodiments, the first and second encryption modules 121 and 122 may be embedded in the first and second function modules 111 and 112, respectively.

For instance, the first and second encryption modules 121 and 122 may be implemented as interface circuits that output data to the bus 131 and receive data from the bus 131 in the first and second function modules 111 and 112, respectively. Alternatively, the first and second encryption modules 121 and 122 may be interposed between the bus 131 and the first and second function modules 111 and 112, respectively. At this time, an existing function module may be used without being modified. In other words, when the first and second encryption modules 121 and 122 are added, data of each channel can be protected without modification of an existing function module.

Figure 2:
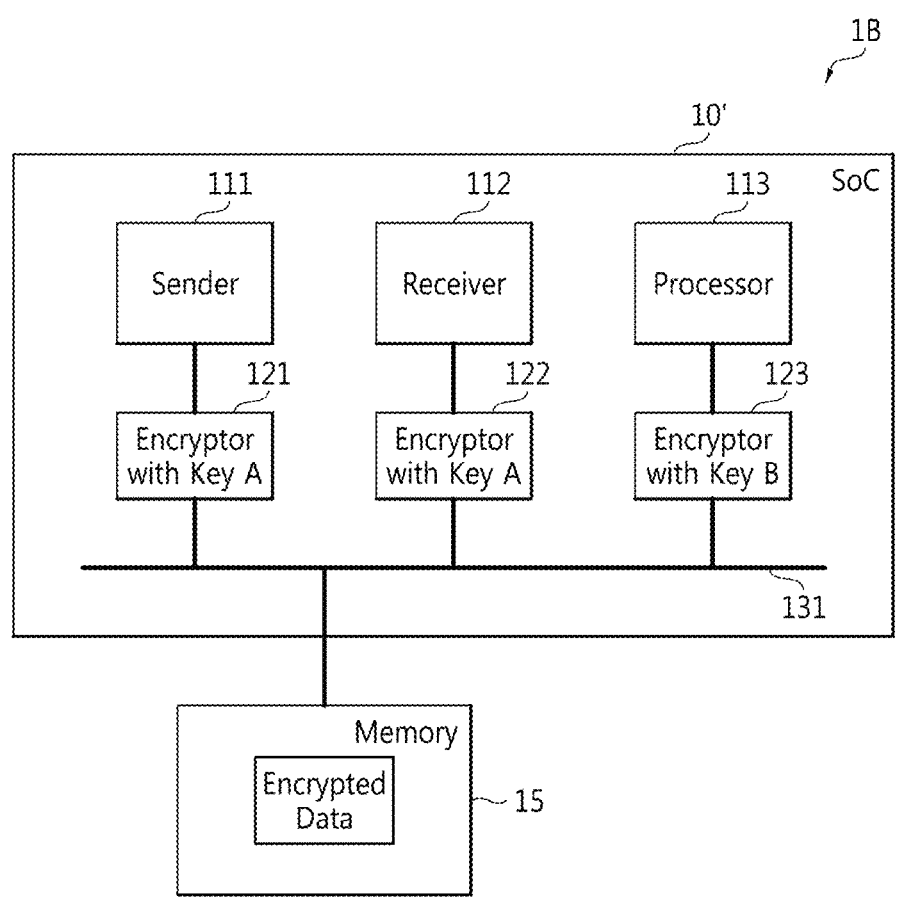
FIG. 2 is a structural block diagram of an electronic system according to some example embodiments of the inventive concepts.

FIG. 2 is a structural block diagram of an electronic system 1B according to some example embodiments of the inventive concepts. Referring to FIG. 2, a semiconductor device 10' includes the first through third function modules 111 through 113, first through third encryption modules 121, 122, and 123, and the bus 131. Example embodiments illustrated in FIG. 2 are similar to those illustrated in FIG. 1 and, therefore, differences therebetween will mainly be described to avoid redundancy.

The semiconductor device 10' illustrated in FIG. 2 further includes the third encryption module 123 as compared to the semiconductor device 10 illustrated in FIG. 1. The third encryption module 123 encrypts data to be output to the bus 131 from the third function module 113 using a second encryption key (i.e., key B) or decrypts data transmitted to the third function module 113 using the second encryption key.

Like the first and second encryption modules 121 and 122, the third encryption module 123 may be formed separated from or embedded in the third function module 113. For instance, the third encryption module 123 may be implemented as a part of an interface circuit (not shown) that outputs data to the bus 131 from within the third function module 113 and receives data from the bus 131. Alternatively, the third encryption module 123 may be interposed between the third function module 113 and the bus 131.

As described above, one encryption key (i.e., key A) is used for modules (e.g., the first and second function modules 111 and 112) that communicate data with each other and a different encryption key (i.e., key B) is used for another function module (e.g., the third function module 113). In other words, different encryption keys are used for different channels, respectively, so that each of the first through third function modules 111 through 113 cannot read out data of channels other than its own channel.

The encryption keys (i.e., key A and key B) may be set by the third function module 113 or an operating system (OS). They may be set differently every time a session starts. For instance, an encryption key used between the first and second function modules 111 and 112 in the first session may be different from an encryption key used therebetween in the second session.

Figure 3:
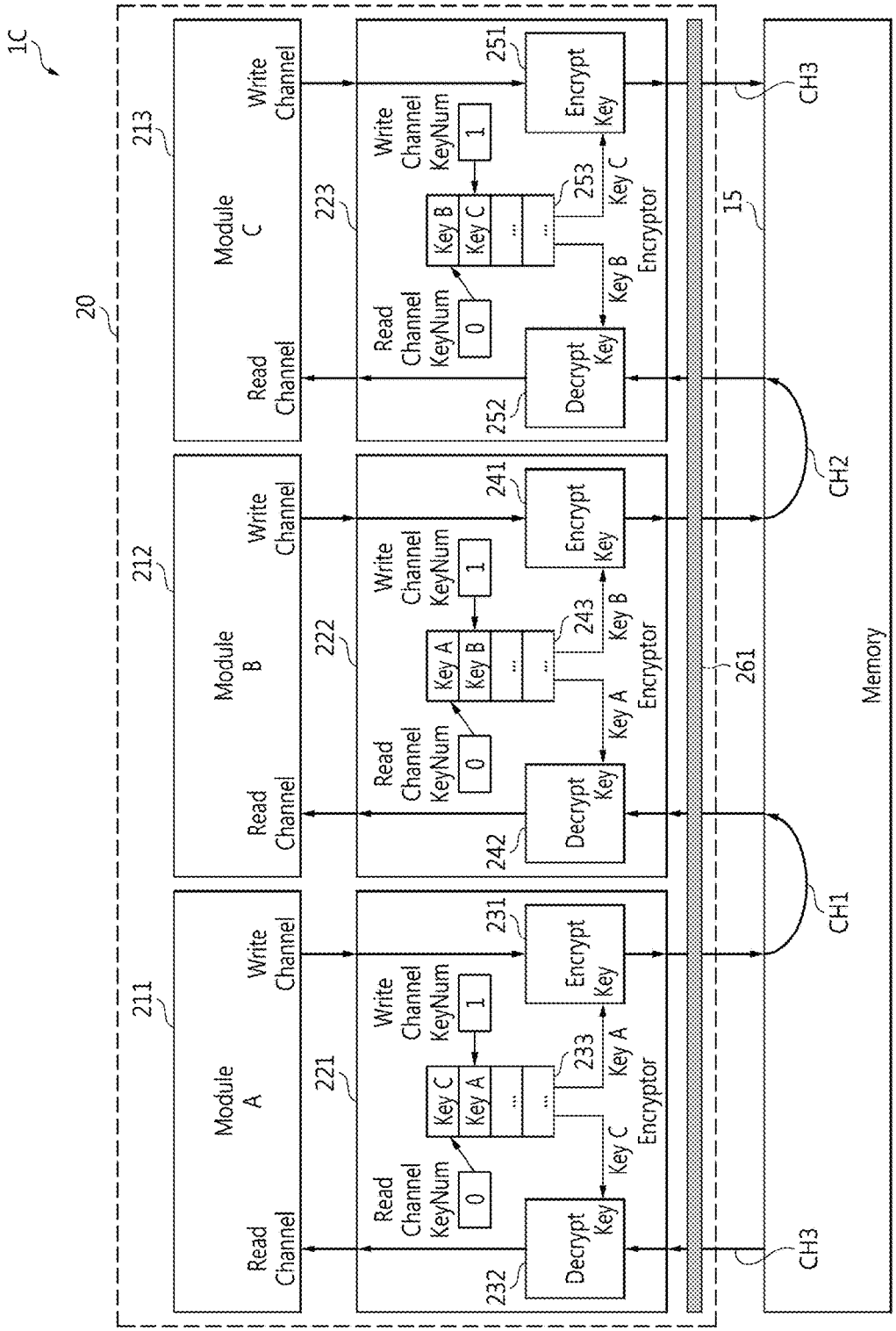
FIG. 3 is a structural block diagram of an electronic system according to some example embodiments of the inventive concepts.

FIG. 3 is a structural block diagram of an electronic system 1C according to some example embodiments of the inventive concepts. A semiconductor device 20 includes first through third function modules 211, 212, and 213; first through third encryption modules 221, 222, and 223; and a bus 261. The structure and functions of the example embodiments illustrated in FIG. 3 are similar to those of the example embodiments illustrated in FIG. 2 and, therefore, differences therebetween will be mainly described.

In the example embodiments illustrated in FIG. 3, a single function module may be used to form a plurality of function modules and a plurality of channels. In detail, the first function module 211 may transmit data to the second function module 212 through a first channel CH1 and may receive data from the third function module 213 through a third channel CH3. The second function module 212 may receive data from the first function module 211 through the first channel CH1 and may transmit data to the third function module 213 through a second channel CH2. The third function module 213 may receive data from the second function module 212 through the second channel CH2 and may transmit data to the first function module 211 through the third channel CH3.

When a single function module is used to form a plurality of function modules and a plurality of channels as described above, different keys may be used for different channels, respectively. To use different keys for different channels, the first through third encryption modules 221, 222, and 223 may include key storages 233, 243, and 253, respectively, which store a plurality of encryption keys. Each of the key storages 233, 243, and 253 may be implemented as a register or a lookup table, but the inventive concepts are not restricted to these example embodiments.

The first through third encryption modules 221, 222, and 223 may also include encryption components 231, 241, and 251, respectively, each of which selects an encryption key from corresponding one of the key storages 233, 243, and 253 and encrypts first data using the selected encryption key; and decryption components 232, 242, and 252, respectively, each of which decrypts second data using the selected encryption key. The first data may be write data which is output through a write channel of a function module and is then stored in the external memory 15, and the second data may be read data which is read from the external memory 15 and is then input to a read channel of the function module.

In the structure and operations of the first encryption module 221, the first encryption component 231 may select a first channel encryption key (i.e., key A) from the first key storage 233 for data (i.e., write data) output from a corresponding function module (i.e., the first function module 211), and may encrypt the write data using key A. The first decryption component 232 may select a third channel encryption key (i.e., key C) from the first key storage 233 for data (i.e., read data), which has been read from the external memory 15 and will be input to the first function module 211, and may decrypt the read data using key C.

The first encryption component 231 may extract an encryption key corresponding to a first channel key number (i.e., write channel key number), that is, the first channel encryption key (i.e., key A) from the first key storage 233. The first decryption component 232 may extract an encryption key corresponding to a third channel key number (i.e., read channel key number), that is, the third channel encryption key (i.e., key C) from the first key storage 233. The first channel key number and the third channel key number may be addresses respectively indicating the first channel encryption key A and the third channel encryption key C in the first key storage 233.

The structure and operations of the second and third encryption modules 222 and 223 may be the same as those of the first encryption module 221.

As described above, even when two or more channels are formed in a single function module, different encryption keys are used for different channels in some example embodiments of the inventive concepts. In other words, since different encryption keys are used for difference channels, each function module cannot read out data of channels other than its own channel. In addition, an encryption module includes a key storage to store encryption keys for respective channels in order to perform encryption or decryption with respect to at least two channels and extracts and uses an encryption key corresponding to a current channel from the key storage. The encryption keys may be set by a processor or an OS. The encryption keys may also be differently set every time a session starts.

Figure 4:
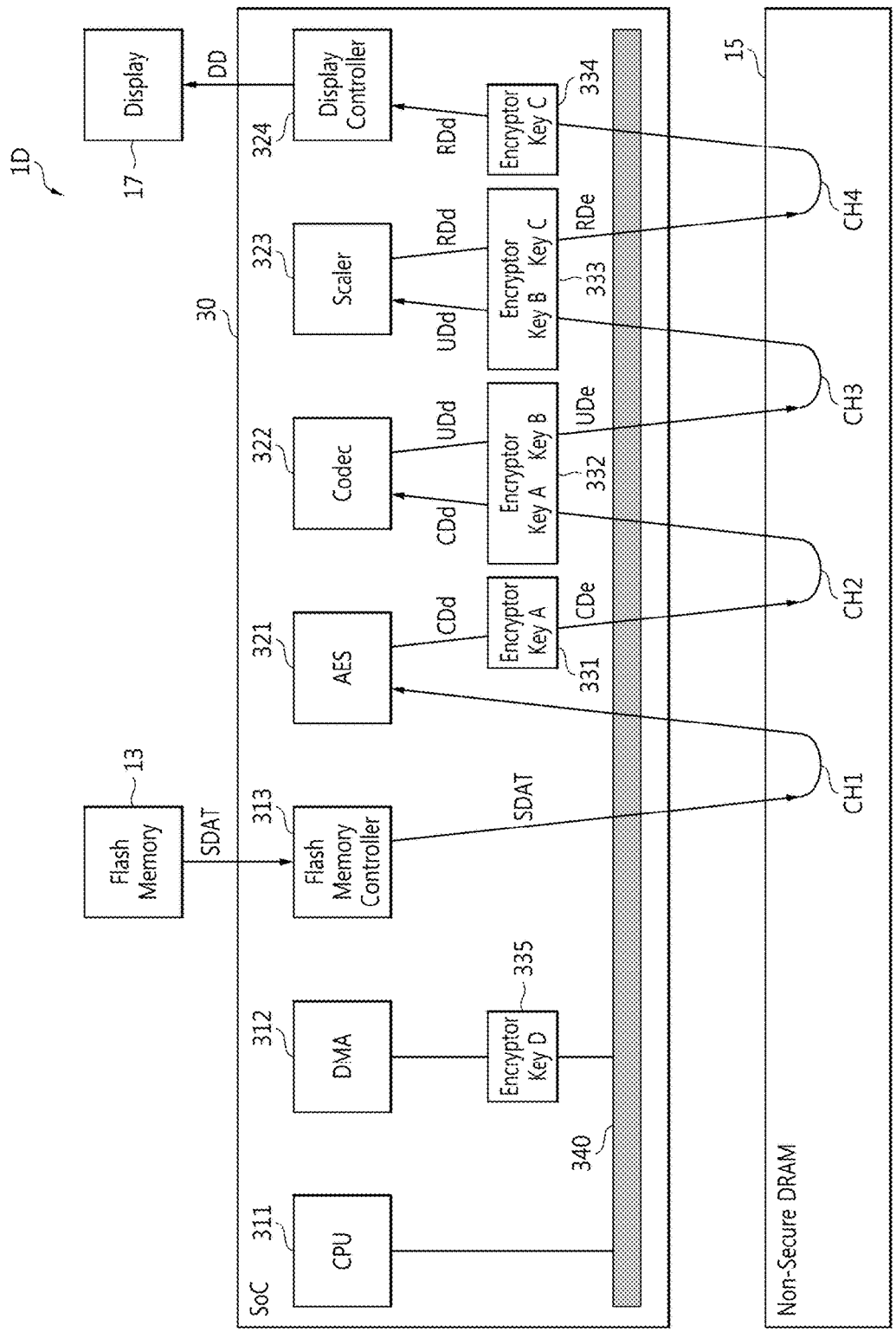
FIG. 4 is a structural block diagram of an electronic system according to some example embodiments of the inventive concepts.

FIG. 4 is a structural block diagram of an electronic system 1D according to some example embodiments of the inventive concepts. Referring to FIG. 4, the electronic system 1D may be implemented as a handheld device such as a cellular phone, a smart phone, a tablet personal computer (PC), a personal digital assistant (PDA), an enterprise digital assistant (EDA), a digital still camera, a digital video camera, a portable multimedia player (PMP), a personal navigation device or portable navigation device (PND), a handheld game console, or an e-book. The electronic system 1D includes a SoC 30, a first memory 13, a second memory 15, and a display device 17.

The SoC 30 includes a CPU 311, a first memory controller 313, a standard encryption module 321, a codec module 322, a scaler 323, a display controller 324, first through fifth encryption modules 331 through 335, and a bus 340. The SoC 30 may also include a direct memory access (DMA) module 312. The SoC 30 may also include other elements such as a GPU, a clock management unit, and a power management unit.

The first memory 13 may be a flash memory and the first memory controller 313 may be flash memory controller. However, the inventive concepts are not restricted to these example embodiments.

The second memory 15 may be dynamic random access memory (DRAM) but is not restricted thereto. The SoC 30 may also include a DRAM controller (not shown) operating as a second memory controller.

Source data (e.g., pay video) SDAT stored in the first memory 13 may be read through the first memory controller 313 and stored in the second memory 15. The source data SDAT stored in the first memory 13 may have been compressed according to a compression algorithm (that may or may not be predetermined) and has been encrypted according to a standard encryption algorithm (that may or may not be predetermined) (e.g., an advanced encryption standard (AES) or a data encryption standard (DES)).

The standard encryption module 321 may read the source data SDAT from the second memory 15 and decrypt it according to the standard encryption algorithm. Data CDd decrypted by the standard encryption module 321 may be encrypted by a first encryption module 331 using first encryption key A and then stored in the second memory 15.

The codec module 322 reads data CDe encrypted by the first encryption module 331 from the second memory 15. The data CDe read from the second memory 15 is decrypted by a second encryption module 332 using first encryption key A and then input to the codec module 322.

The codec module 322 decodes the data CDd. The data CDd input to the codec module 322 has been compressed. The codec module 322 restores data, which is not compressed, by decoding the data that has been compressed.

Data UDd decoded by the codec module 322 may be encrypted by the second encryption module 332 using second encryption key B and then stored in the second memory 15.

As described above, the second encryption module 332 decrypts data that has been read from the second memory 15 using first encryption key A while encrypting data that will be stored in the second memory 15 using second encryption key B different from first encryption key A.

The scaler 323 reads data UDe encrypted by the second encryption module 332 from the second memory 15. The data UDe read from the second memory 15 is decrypted by a third encryption module 333 using second encryption key B and then input to the scaler 323. The scaler 323 may change the size of data.

Data RDd that has been changed by the scaler 323 may be encrypted by the third encryption module 333 using third encryption key C and then stored in the second memory 15.

The third encryption module 333 decrypts data that has been read from the second memory 15 using second encryption key B and encrypts data to be stored in the second memory 15 using third encryption key C different from second encryption key B.

The display controller 324 reads data RDe encrypted by the third encryption module 333 from the second memory 15. The data RDe read from the second memory 15 is decrypted by a fourth encryption module 334 using third encryption key C and then input to the display controller 324. The display controller 324 may convert data RDd read from the second memory 15 into data DD appropriate to be displayed on the display device 17, and may output the data DD to the display device 17.

A fifth encryption module 335 may be connected to the DMA module 312. The fifth encryption module 335 may encrypt data output from the DMA module 312 using fourth encryption key D and store encrypted data in the second memory 15 or may decrypt data, which is read from the second memory 15 and then input to the DMA module 312, using fourth encryption key D.

In the example embodiments illustrated in FIG. 4, a plurality of channels (i.e., first through fourth channels CH1 through CH4) form a single chain. Different encryption keys are used for the respective channels forming the chain. Accordingly, each function module cannot read out data of channels other than its own channel. The second and third encryption modules 332 and 333 illustrated in FIG. 4 may have the structure of one of the first through third encryption modules 221 through 223 illustrated in FIG. 3.

Although the source data SDAT and the encrypted data CDe, UDe, and RDe are stored in one memory (e.g., second memory 15 in the example embodiments illustrated in FIG. 4), the inventive concepts are not restricted to these example embodiments. The source data SDAT and the encrypted data CDe, UDe, and RDe may be stored in different memories or buffers in some example embodiments.

Figure 5:
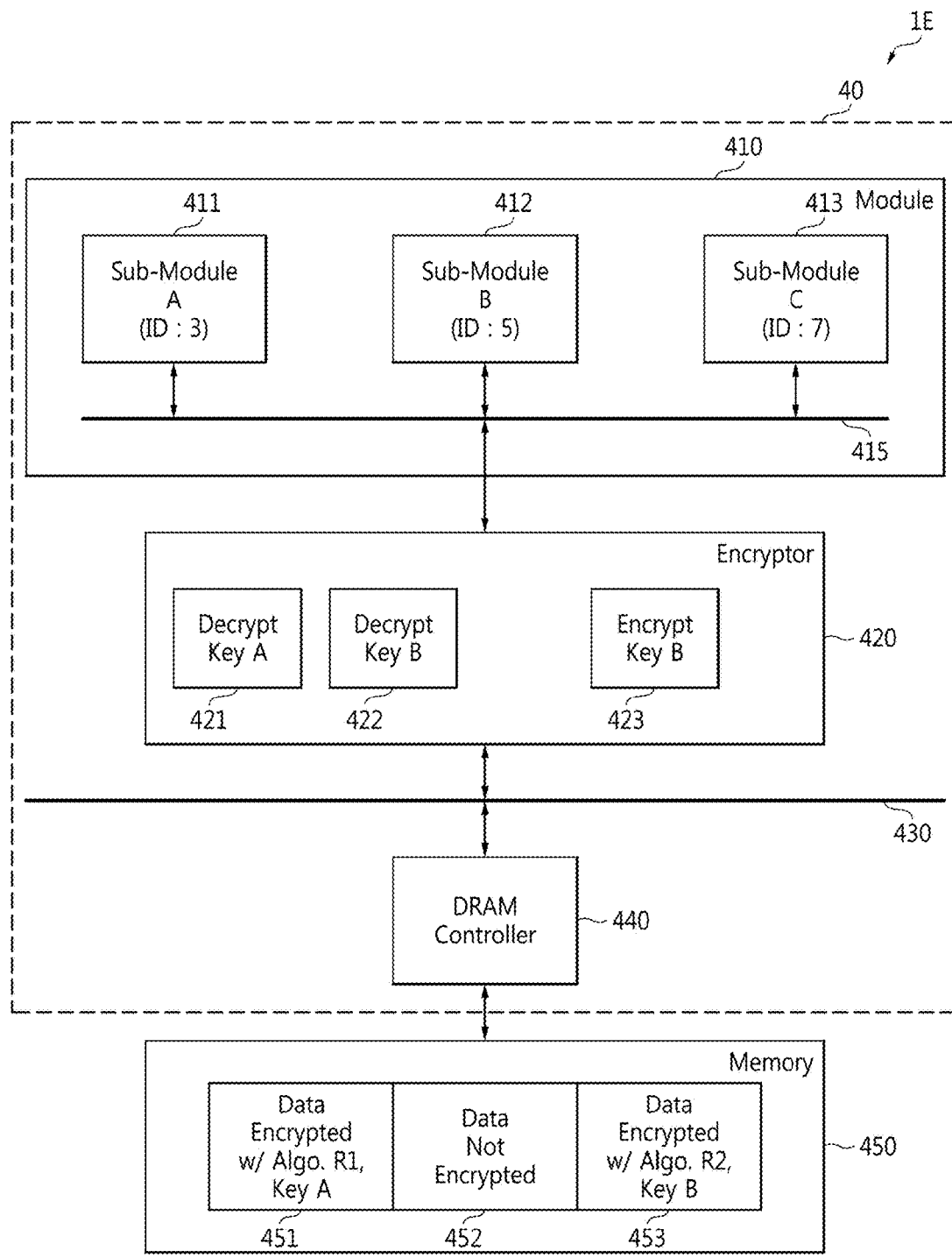
FIG. 5 is a structural block diagram of an electronic system according to some example embodiments of the inventive concepts.

FIG. 5 is a structural block diagram of an electronic system 1E according to some example embodiments of the inventive concepts. FIG. 6A is a table showing an encryption policy per bus ID with respect to a read channel in a semiconductor device 40 illustrated in FIG. 5. FIG. 6B is a table showing an encryption policy per bus ID with respect to a write channel in the semiconductor device 40 illustrated in FIG. 5.

Referring to FIG. 5 and FIGS. 6A and 6B, the electronic system 1E may include the semiconductor device 40 and a memory 450. The semiconductor device 40 may include a function module 410, an encryption module 420, a bus 430, and a memory controller 440.

The function module 410 may include a plurality of sub modules. In some example embodiments, the function module 410 includes first through third sub modules 411, 412, and 413. The function module 410 may also include an internal bus 415. The internal bus 415 may be a part of the bus 430 or may be a separate bus from the bus 430.

The first through third sub modules 411, 412, and 413 may have different data access patterns from one another and may also have different bus IDs. Therefore, an encryption policy may be different for each of the first through third sub modules 411, 412, and 413.

The encryption policy may include at least one among encryption or non-encryption, an encryption algorithm, and an encryption key. Since the first through third sub modules 411, 412, and 413 have different bus IDs from one another, a different encryption policy may be set for each bus ID.

Although not shown in FIG. 5, an ID bus for transmitting bus ID information may be provided separately from a data bus. In this case, the bus ID information may be transmitted separately from data through the ID bus. In some example embodiments, bus ID information may be transmitted together with data.

The encryption module 420 includes first and second decryption components 421 and 422, and a first encryption component 423. The encryption module 420 may also include a key storage (not shown) for storing the bus ID-to-encryption policy tables illustrated in FIGS. 6A and 6B.

Referring to FIG. 6A, encryption policies for respective bus IDs with respect to a read channel may be set in a table. In other words, the encryption module 420 may include a read channel key storage that stores an encryption policy for a bus ID with respect to the read channel.

As shown in FIG. 6A, a first encryption algorithm R1 and first encryption key A may be set for bus ID number 3; a non-encryption policy may be set for bus ID number 5; and a second encryption algorithm R2 and second encryption key B may be set for bus ID number 7. For instance, the read channel key storage may store an identifier of the first encryption algorithm R1 and first encryption key A for bus ID number 3, may store a value indicating the non-encryption policy for bus ID number 5, and may store an identifier of the second encryption algorithm R2 and second encryption key B for bus ID number 7.

The identifier of the first encryption algorithm R1 may be information for identifying an encryption/decryption component in which the first encryption algorithm R1 is implemented, and the identifier of the second encryption algorithm R2 may be information for identifying an encryption/decryption component in which the second encryption algorithm R2 is implemented. In other words, separate encryption/decryption components may be provided for respective encryption algorithms and an encryption/decryption component corresponding to a certain algorithm may be selected.

The encryption module 420 may input first data 451 read from the memory 450 to the first decryption component 421, in which the first encryption algorithm R1 is implemented, according to values set in the table illustrated in FIG. 6A; may decrypt the first data 451 in the first decryption component 421 using first encryption key A; and may provide first decrypted data for the first sub module 411. The first data 451 may be data that has been encrypted using the first encryption algorithm R1 and first encryption key A, and stored in the memory 450.

The encryption module 420 may provide second data 452 read from the memory 450 as it is for the second sub module 412 according to the values set in the table illustrated in FIG. 6A without decrypting the second data 452. The second data 452 may be raw data stored in the memory 450 without being encrypted.

The encryption module 420 may input third data 453 read from the memory 450 to the second decryption component 422, in which the second encryption algorithm R2 is implemented, according to the values set in the table illustrated in FIG. 6A; may decrypt the third data 453 in the second decryption component 422 using second encryption key B; and may provide decrypted third data for the third sub module 413. The third data 453 may be data that has been encrypted using the second encryption algorithm R2 and second encryption key B and stored in the memory 450.

Referring to FIG. 6B, encryption policies for respective bus IDs with respect to a write channel may be set in a table. In other words, the encryption module 420 may include a write channel key storage that stores an encryption policy for a bus ID with respect to the write channel. As shown in FIG. 6B, the non-encryption policy may be set for bus ID number 5; and the second encryption algorithm R2 and second encryption key B may be set for bus ID number 7.

The encryption module 420 may store data output from the second sub module 412 in the memory 450 without encrypting the data according to values set in the table illustrated in FIG. 6B. The encryption module 420 may encrypt data output from the third sub module 413 in the first encryption component 423 using the second encryption algorithm R2 and second encryption key B according to the values set in the table illustrated in FIG. 6B and may store encrypted data in the memory 450.

As described above, a plurality of sub modules are provided within a single function module and a different encryption policy is used for each of the sub modules in some example embodiments.

Figure 7:
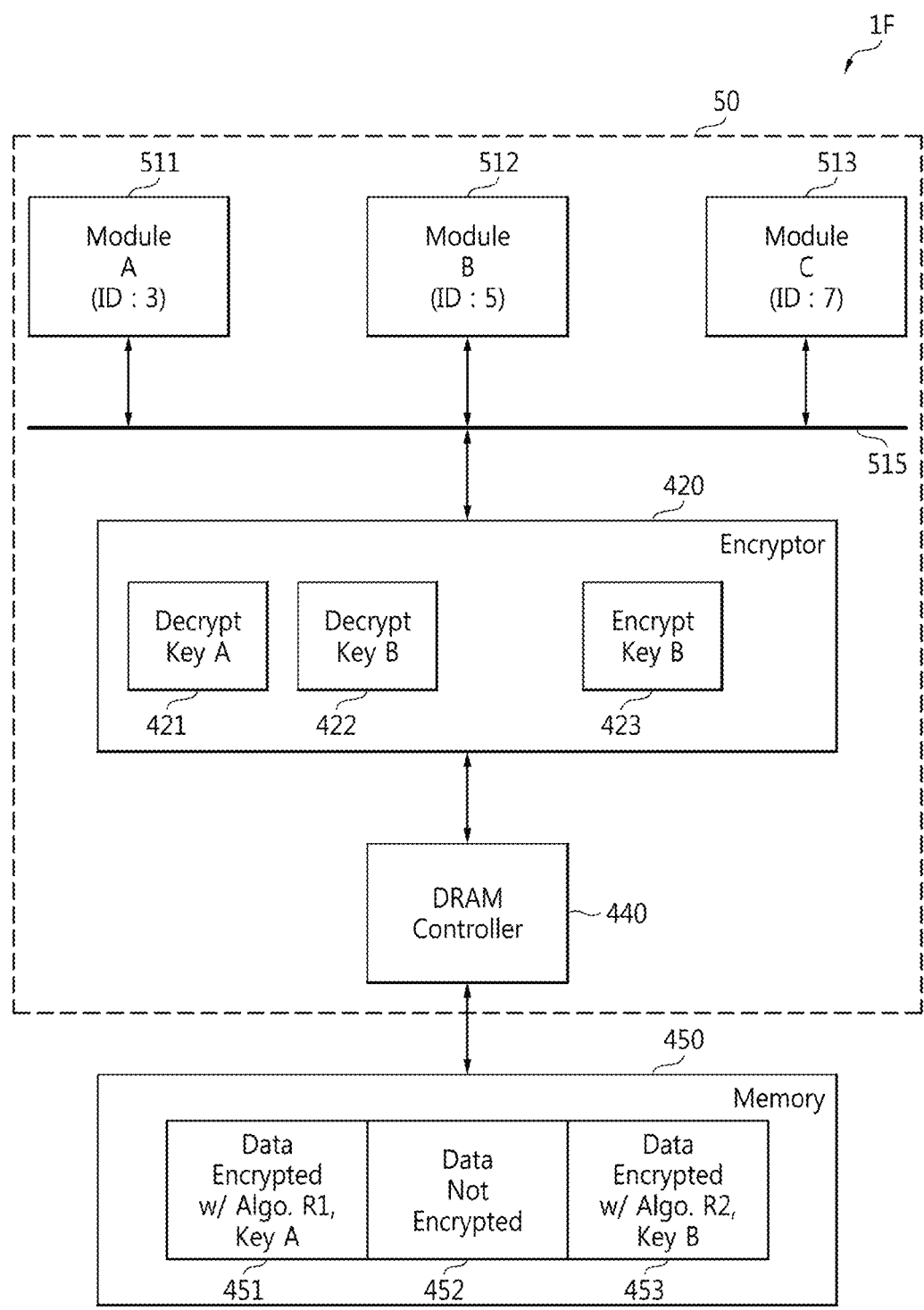
FIG. 7 is a structural block diagram of an electronic system according to some example embodiments of the inventive concepts.

FIG. 7 is a structural block diagram of an electronic system 1F according to some example embodiments of the inventive concepts. Referring to FIG. 7, the electronic system 1F may include a semiconductor device 50 and the memory 450. The semiconductor device 50 may include first through third function modules 511, 512, and 513, the encryption module 420, the memory controller 440, and a bus 515.

The first through third function modules 511, 512, and 513 may have different data access patterns from one another and may also have different bus IDs. Therefore, an encryption policy may be different for each of the first through third function modules 511, 512, and 513.

The encryption policy may include at least one among encryption or non-encryption, an encryption algorithm, and an encryption key. Since the first through third function modules 511, 512, and 513 have different bus IDs from one another, a different encryption policy may be set for each bus ID.

The encryption module 420 includes the first and second decryption components 421 and 422 and the first encryption component 423. The encryption module 420 may also include the bus ID-to-encryption policy tables illustrated in FIGS. 6A and 6B.

Only one encryption module 420 is provided in the semiconductor device 50 in the example embodiments illustrated in FIG. 7. One encryption module 420 applies a different encryption policy (including, for example, encryption or non-encryption, an encryption algorithm, and/or an encryption key) to each of the first through third function modules 511, 512, and 513 according to the bus ID of each function module 511, 512, or 513. As a result, the number of encryption modules is minimized.

Figure 8:
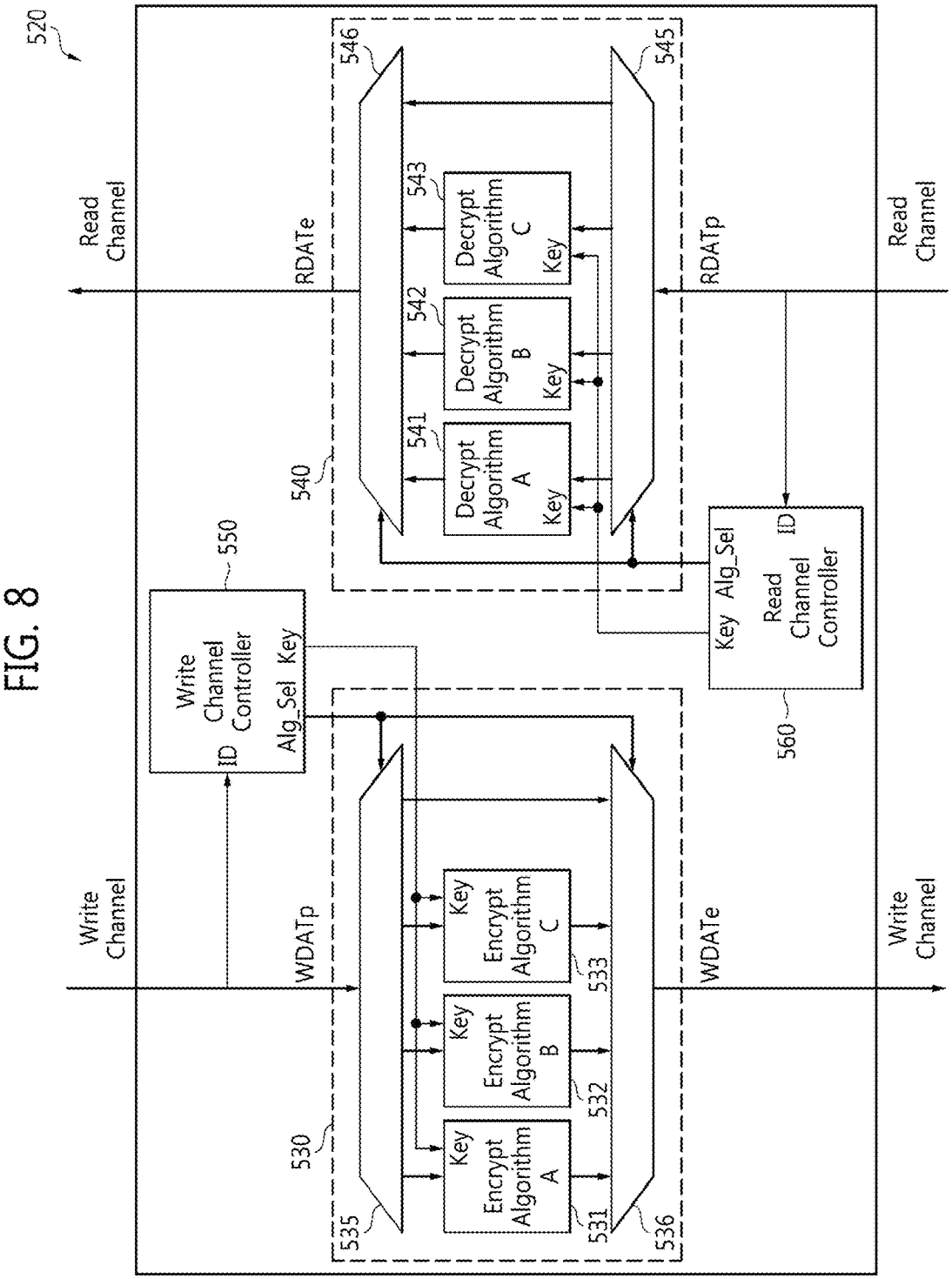
FIG. 8 is a block diagram of an encryption module according to some example embodiments of the inventive concepts.

FIG. 8 is a block diagram of an encryption module 520 according to some example embodiments of the inventive concepts. The encryption module 520 includes an encryption block 530, a decryption block 540, a write channel controller 550, and a read channel controller 560.

The encryption module 520 illustrated in FIG. 8 may be provided within the semiconductor device 10, 10', 20, 30, 40, or 50. The encryption module 520 may replace at least one of the encryption modules 121, 122, 123, 221, 222, 223, 331, 332, 333, 334, and 335.

The encryption block 530 may include a plurality of encryption components (e.g., first through third encryption components 531, 532, and 533). The encryption block 530 may also include a first selector 535 to input write channel data WDATp to one of the first through third encryption components 531, 532, and 533 or to let the write channel data WDATp bypass the first through third encryption components 531, 532, and 533 according to an algorithm identifier Alg_sel. The first through third encryption components 531, 532, and 533 may have different encryption algorithms, respectively.

The write channel controller 550 receives a bus ID from a write channel and outputs an encryption key and the algorithm identifier Alg_sel which correspond to the bus ID based on a mapping table (not shown) stored in advance. For instance, when the algorithm identifier Alg_sel is "00", the first encryption component 531 may be selected. When the algorithm identifier Alg_sel is "01", the second encryption component 532 may be selected. When the algorithm identifier Alg_sel is "10", the third encryption component 533 may be selected. When the algorithm identifier Alg_sel is "11", a bypass path may be selected. The mapping table may store information about an encryption key and the algorithm identifier Alg_sel for each bus ID and may be similar to the table illustrated in FIG. 6B.

The encryption block 530 may also include a second selector 536 to selectively output data among the output data of the first through third encryption components 531, 532, and 533, and the bypassed data, according to the algorithm identifier Alg_sel.

Consequently, the encryption block 530 encrypts and outputs the write channel data WDATp using an encryption key selected by an encryption component selected according to a bus ID or bypasses the write channel data WDATp. The write channel data WDATp may be data output from the function module 111, 112, 113, 211, 212, 213, 410, 511, 512, or 513. Output data WDATe of the second selector 536 may be data input to the memory 13, 15, or 450.

The decryption block 540 may include a plurality of decryption components (e.g., first through third decryption components 541, 542, and 543). The decryption block 540 may also include a third selector 545 to input read channel data RDATp to one of the first through third decryption components 541, 542, and 543 or to let the read channel data RDATp bypass the first through third decryption components 541, 542, and 543 according to the algorithm identifier Alg_sel. The first through third decryption components 541, 542, and 543 may have different decryption algorithms, respectively.

The read channel controller 560 receives a bus ID from a read channel and outputs a decryption key and the algorithm identifier Alg_sel which correspond to the bus ID based on a mapping table (not shown) stored in advance. For instance, when the algorithm identifier Alg_sel is "00", the first decryption component 541 may be selected. When the algorithm identifier Alg_sel is "01", the second decryption component 542 may be selected. When the algorithm identifier Alg_sel is "10", the third decryption component 543 may be selected. When the algorithm identifier Alg_sel is "11", a bypass path may be selected. The mapping table may store information about an encryption key and the algorithm identifier Alg_sel for each bus ID and may be similar to the table illustrated in FIG. 6A.

The decryption block 540 may also include a fourth selector 546 to selectively output one among the output data of the first through third decryption components 541, 542, and 543, and the bypassed data, according to the algorithm identifier Alg_sel.

The read channel data RDATp may be data output from the memory 13, 15, or 450. Output data RDATe of the fourth selector 546 may be data input to the function module 111, 112, 113, 211, 212, 213, 410, 511, 512, or 513.

Figure 9A:
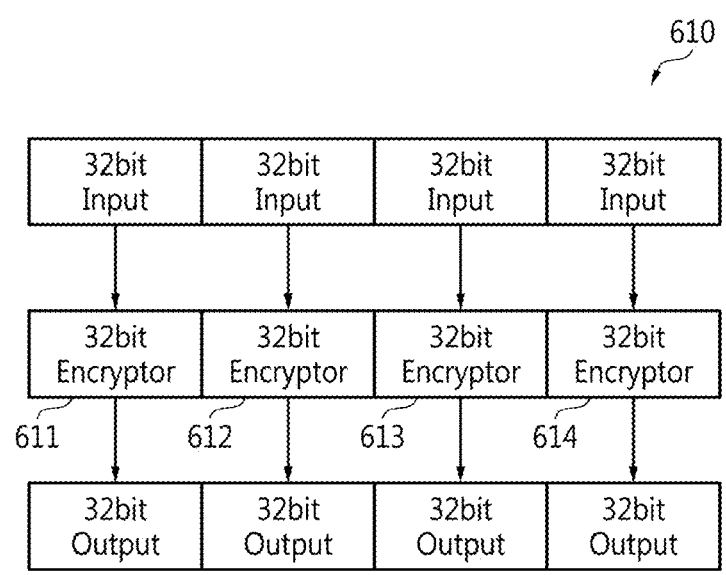
FIG. 9A is a diagram of an encryption module when a minimum unit of data access is 32 bits in size.
Figure 9B:
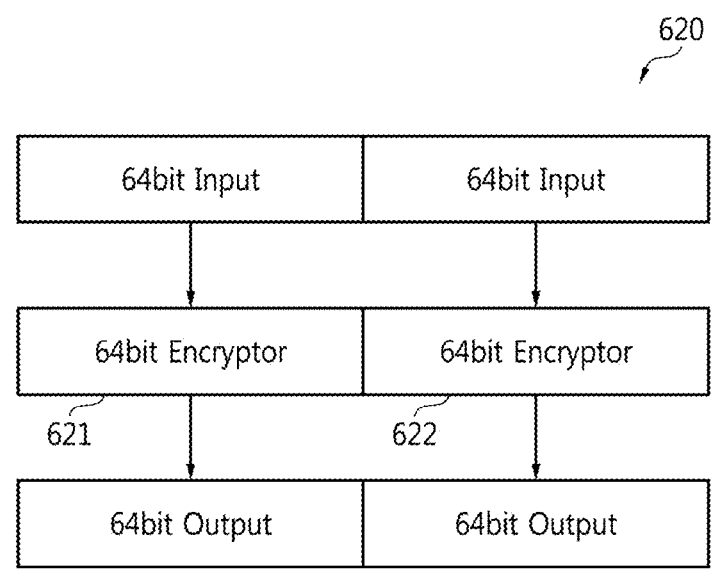
FIG. 9B is a diagram of an encryption module when a minimum unit of data access is 64 bits in size.
Figure 9C:
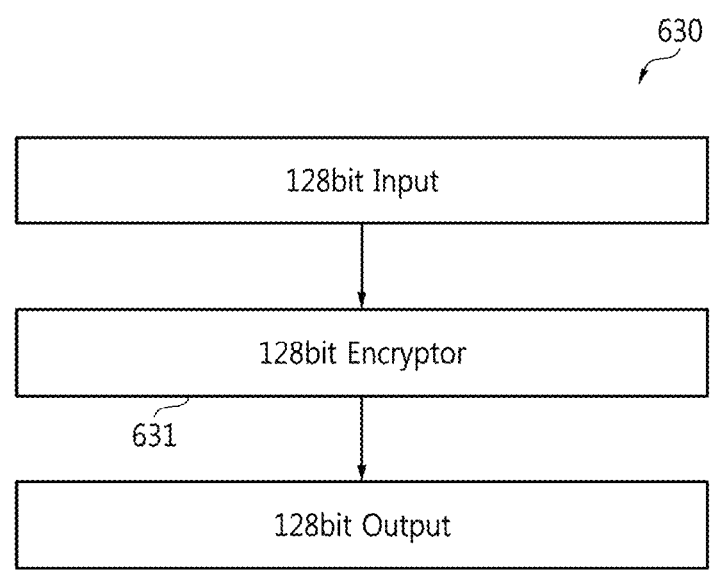
FIG. 9C is a diagram of an encryption module when a minimum unit of data access is 128 bits in size.

FIG. 9A is a diagram of an encryption module 610 when a minimum unit of data access is 32 bits in size. FIG. 9B is a diagram of an encryption module 620 when a minimum unit of data access is 64 bits in size. FIG. 9C is a diagram of an encryption module 630 when a minimum unit of data access is 128 bits in size.

A function module may access data in various units. For instance, a function module may have a minimum data access unit of 8, 16, 32, 64 or 128 bits. A minimum data access unit may be the minimum number of bits in data output from or input to a function module at a time. For instance, when 16-, 32- or 64-bit data is input to or output from a function module at a time, the minimum data access unit of the function module is 16 bits. An encryption/decryption component of an encryption module may also be differently set according to the minimum data access unit of a function module corresponding to the encryption module.

The encryption module 610 illustrated in FIG. 9A may be formed of four 32-bit sub-encryption modules 611, 612, 613, and 614. Each of the 32-bit sub-encryption modules 611, 612, 613, and 614 may receive and encrypt or decrypt 32-bit input data and output 32-bit output data.

The encryption module 620 illustrated in FIG. 9B may be formed of two 64-bit sub-encryption modules 621 and 622. Both of the 64-bit sub-encryption modules 621 and 622 may receive and encrypt or decrypt 64-bit input data and output 64-bit output data.

The encryption module 630 illustrated in FIG. 9C may be formed of a 128-bit encryption module 631. The 128-bit encryption module 631 may receive and encrypt or decrypt 128-bit input data and output 128-bit output data.

More generally, at least one encryption module may comprise 'm' sub-encryption modules configured to encrypt n-bit data, where 'm' and 'n' are integers. The integer 'm' may be greater than or equal to 1 (e.g., greater than or equal to 2), while the integer 'n' may be greater than or equal to 2. The at least one encryption module may be configured to encrypt data of greater than or equal to 'n' bits and less than or equal to 'm*n' bits.

Consequently, an encryption module performs encryption or decryption in accordance with the minimum data access unit of a function module corresponding to the encryption module.

Figure 10:
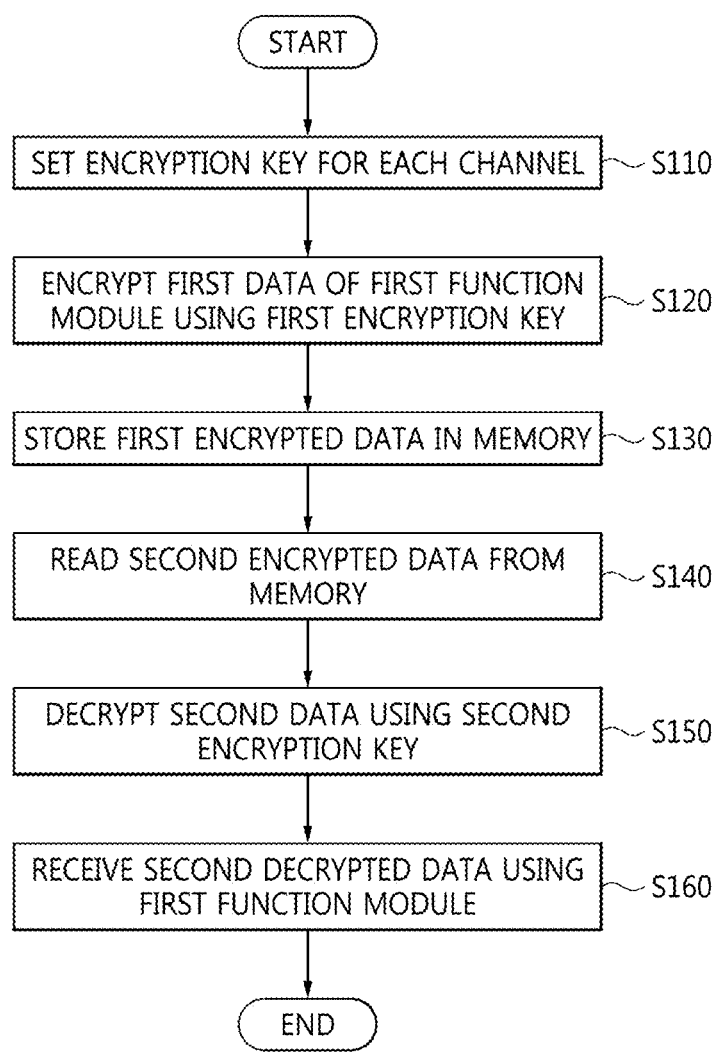
FIG. 10 is a flowchart of an encryption method according to some example embodiments of the inventive concepts.

FIG. 10 is a flowchart of an encryption method according to some example embodiments of the inventive concepts. In the method illustrated in FIG. 10, an encryption key is set for each channel in operation S110. For instance, a first encryption key is set for a first channel and a second encryption key is set for a second channel.

First data of a first function module is encrypted using the first encryption key in operation S120. First encrypted data may be transmitted to another function module (e.g., a second function module) through the first channel.

The first channel may include a path between the first function module and a memory and a path between the memory and the second function module. Accordingly, the first encrypted data may be stored in the memory in operation S130. The first encrypted data may be read from the memory and then decrypted using the first encryption key before being input to the second function module.

Meanwhile, second encrypted data is read from the memory in operation S140. The second encrypted data is decrypted using the second encryption key in operation S150. The first function module may receive second decrypted data through the second channel.

The first data may be write data to be stored in the memory by the first function module and the second data may be read data that has been read from the memory by the first function module. The first channel may be a write channel of the first function module and the second channel may be a read channel of the first function module.

Figure 11:
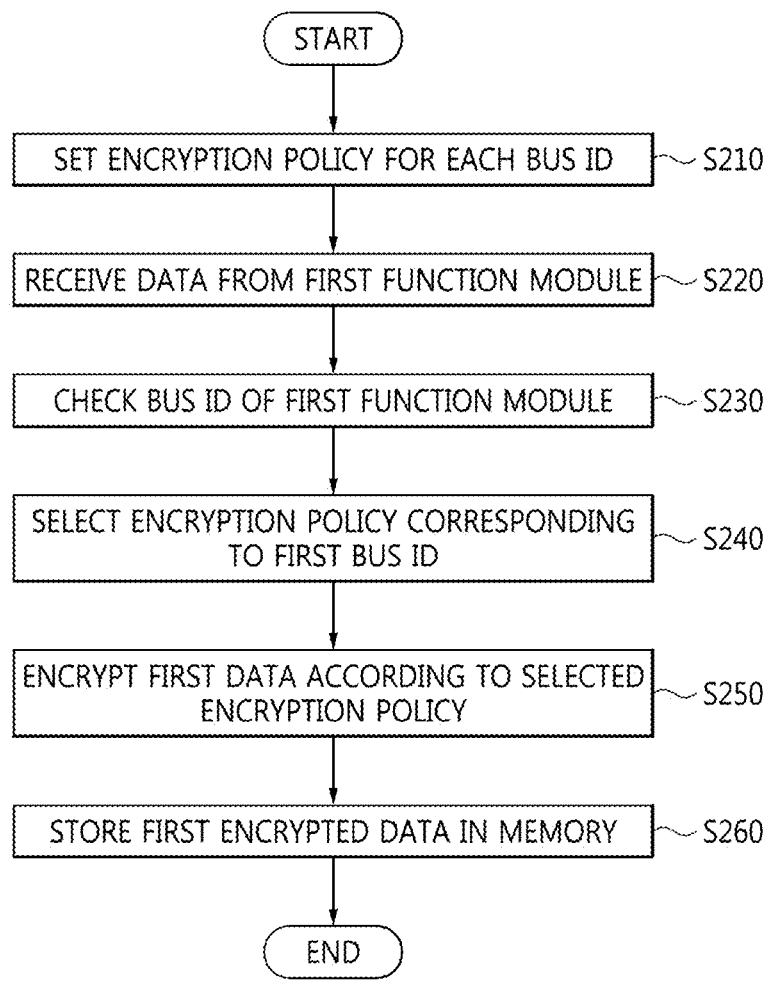
FIG. 11 is a flowchart of an encryption method according to some example embodiments of the inventive concepts.

FIG. 11 is a flowchart of an encryption method according to some example embodiments of the inventive concepts. In the method illustrated in FIG. 11, an encryption policy is set for each bus ID in operation S210. The encryption policy may include encryption or non-encryption, an encryption algorithm, and an encryption key. For instance, a first encryption algorithm and a first encryption key may be set for a first bus ID; a non-encryption policy may be set for a second bus ID; and a second encryption algorithm and a second encryption key may be set for a third bus ID. The encryption policies for the respective bus IDs may be implemented in a lookup table within an encryption module.

When the encryption module receives first data from a first function module in operation S220, it checks a bus ID of the first function module in operation S230. When the bus ID of the first function module is the first bus ID, an encryption policy corresponding to the first bus ID is selected in operation S240. The first data is encrypted according to the selected encryption policy in operation S250. First encrypted data is stored in a memory in operation S260.

Figure 12:
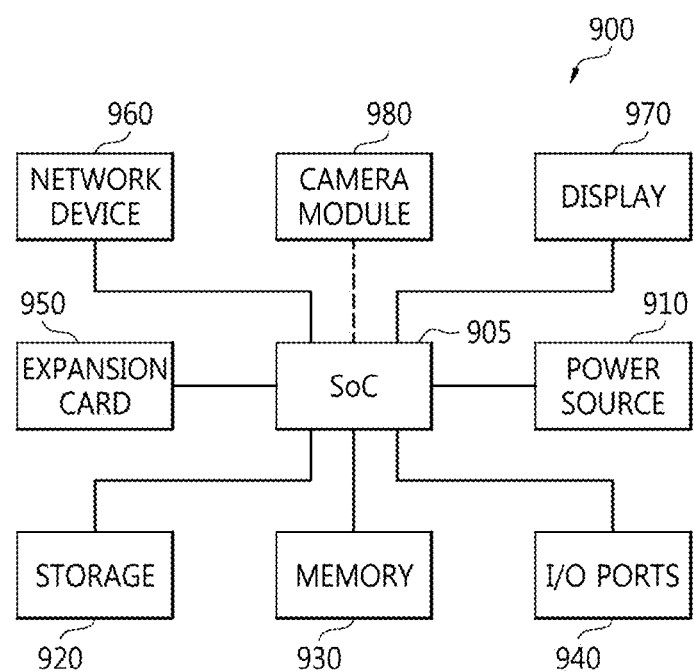
FIG. 12 is a block diagram of an electronic system 900 according to some example embodiments of the inventive concepts.

FIG. 12 is a block diagram of an electronic system 900 according to some example embodiments of the inventive concepts. Referring to FIG. 12, the electronic system 900 may be implemented as a personal computer (PC), a data server, or a portable device.

The portable device may be a laptop computer, a cellular phone, a smart phone, a tablet PC, a personal digital assistant (PDA), an enterprise digital assistant (EDA), a digital still camera, a digital video camera, a portable multimedia player (PMP), a portable navigation device (PND), a handheld game console, or an e (electronic)-book device.

The electronic system 900 includes a SoC 905, a power source 910, a storage 920, a memory 930, input/output (I/O) ports 940, an expansion card 950, a network device 960, and a display 970.

According to some example embodiments, the electronic system 900 may further include a camera module 980.

The SoC 905 may be one of the semiconductor devices 10, 10', 20, 30, 40 or 50 illustrated in FIGS. 1 through 7.

The SoC 905 may control the operation of at least one of the elements 910 through 970. The power source 910 may supply an operating voltage to at least one of the elements 905 and 920 through 970. The storage 920 may be implemented by a hard disk drive (HDD) or a solid state drive (SSD).

The memory 930 may be implemented by a volatile or non-volatile memory. A memory controller (not shown) that controls a data access operation (e.g., a read operation, a write operation, or a program operation) or an erase operation on the memory 930 may be integrated into or embedded in the SoC 905. Alternatively, the memory controller may be provided between the SoC 905 and the memory 930.

The I/O ports 940 are ports that receive data transmitted to the electronic system 900 or transmit data from the electronic system 900 to an external device. For instance, the I/O ports 940 may include a port connecting with a pointing device such as a computer mouse, a port connecting with a printer, and a port connecting with a universal serial bus (USB) drive.

The expansion card 950 may be implemented as a secure digital (SD) card or a multimedia card (MMC). The expansion card 950 may be a subscriber identity module (SIM) card or a universal SIM (USIM) card.

The network device 960 enables the electronic system 900 to be connected with a wired or wireless network. The display 970 displays data output from the storage 920, the memory 930, the I/O ports 940, the expansion card 950, or the network device 960.

The camera module 980 converts optical images into electrical images. Accordingly, the electrical images output from the camera module 980 may be stored in the storage 920, the memory 930, or the expansion card 950. Also, the electrical images output from the camera module 980 may be displayed through the display 970.

The present general inventive concepts can be embodied as hardware, software, or combinations of hardware and software.

In some example embodiments, some of the elements may be implemented as a 'module'. According to some example embodiments, 'module' means software-based components or hardware components, such as a field programmable gate array (FPGA) or an application specific integrated circuit (ASIC), and the module may perform certain functions. However, the module is not limited to software or hardware. The module may be configured so as to be placed in a storage medium which may perform addressing, or to execute one or more processors.

The above-described method may be written as computer programs and may be implemented in general-use digital computers that execute the programs using a computer-readable recording medium. Data structure used in the above-described method may be recorded in a computer-readable recording medium by using various methods. Examples of the computer-readable recording medium include magnetic storage media (e.g., ROM (Read-Only Memory), RAM (Random-Access Memory), USB (Universal Serial Bus), floppy disks, hard disks, etc.) and storage media such as optical recording media (e.g., CD-ROMs (Compact Disc-ROM), or DVDs (Digital Video Discs)) and PC (personal computer) interfaces (e.g., PCI (Peripheral Component Interconnect), PCI-express, Wi-Fi, etc.).

Some example embodiments may be implemented through a medium including computer-readable codes/instructions to control at least one processing element of the above-described embodiment, for example, a computer-readable medium. Such a medium may correspond to a medium/media that may store and/or transmit the computer-readable codes.

The computer-readable codes may be recorded in a medium or be transmitted over the Internet. For example, the medium may include a ROM, a RAM, a CD-ROM, a magnetic tape, a floppy disc, an optical recording medium, or a carrier wave such as data transmission over the Internet. Further, the medium may be a non-transitory computer-readable medium. Since the medium may be a distributed network, the computer-readable code may be stored, transmitted, and executed in a distributed manner. Further, for example, the processing element may include a processor or a computer processor, and be distributed and/or included in one device.

As described above, according to some example embodiments of the inventive concepts, each of a plurality of channels formed among a plurality of modules in a semiconductor device is protected from the other channels, so that data leaking and data hacking is prevented. In addition, an encryption module is provided in an interface of an existing module or as provided between the existing module and a bus without changing the existing module, so that each channel is protected.

While the inventive concepts have been particularly shown and described with reference to some example embodiments thereof, it will be understood by those of ordinary skill in the art that various changes in forms and details may be made therein without departing from the spirit and scope of the inventive concepts as defined by the following claims.

It should be understood that example embodiments described herein should be considered in a descriptive sense only and not for purposes of limitation. Descriptions of features or aspects within example embodiments should typically be considered as available for other similar features or aspects in other example embodiments.

What is claimed is:

1. A semiconductor device, comprising:
a bus;
first and second modules configured to communicate data with a memory via the bus, the first and second modules being separate from the memory; and
an encryption module configured to respectively use different encryption policies for first data, which is output from the first module and stored in the memory, and second data, which is output from the second module and stored in the memory, the encryption module configured to determine the different encryption policies based directly on first and second bus identifications (IDs) corresponding to the first and second modules, respectively, wherein the encryption module includes a key storage configured to store the different encryption policies respectively corresponding to the first bus ID and the second bus ID, the different encryption policies including at least (i) a first encryption policy specifying a first encryption key and an identifier of a first encryption algorithm corresponding to the first bus ID, and (ii) a second encryption policy specifying a second encryption key and an identifier of a second encryption algorithm corresponding to the second bus ID, the second encryption key and the second encryption algorithm being different from the first encryption key and the first encryption algorithm, respectively.

2. The semiconductor device of claim 1, wherein the encryption module is further configured to encrypt the first data output from the first module using the first encryption key and the first encryption algorithm to generate first encrypted data, and to encrypt the second data output from the second module using the second encryption key and the second encryption algorithm, different from the first encryption key and the first encryption algorithm, to generate second encrypted data.

3. The semiconductor device of claim 1, wherein the encryption module comprises:
a first encryption/decryption component configured to encrypt the first data using the first encryption key and the first encryption algorithm and to decrypt the encrypted first data using the first encryption key and the first encryption algorithm; and
a second encryption/decryption component configured to encrypt the second data using the second encryption key and the second encryption algorithm and to decrypt the encrypted second data using the second encryption key and the second encryption algorithm.

4. The semiconductor device of claim 1, further comprising:
a third module having a third bus ID,
wherein the key storage is further configured to store a non-encryption policy corresponding to the third bus ID, and the encryption module is further configured to store, in the memory, third data output from the third module without encrypting the third data according to the non-encryption policy.

5. The semiconductor device of claim 1, wherein the key storage further comprises:
a read channel key storage configured to store encryption policies for respective bus IDs with respect to a read channel of the first module and a read channel of the second module; and
a write channel key storage configured to store the encryption policies for the respective bus IDs with respect to a write channel of the first module and a write channel of the second module.

6. The semiconductor device of claim 1, wherein,
the encryption module includes 'm' sub-encryption modules configured to encrypt data in units of 'n' bits, where 'm' is an integer greater than or equal to 1 and 'n' is an integer greater than or equal to 2, and
the encryption module is configured to encrypt data in units greater than or equal to 'n' bits and less than or equal to 'm*n' bits.

7. The semiconductor device of claim 1, wherein the semiconductor device is a system on chip (SoC).

8. A semiconductor device, comprising:
a first module configured to output first data;
a second module configured to output second data; and
an encryption module configured to
store a lookup table mapping different bus identifications (IDs) to different encryption policies, the different encryption policies including at least (i) a first encryption policy specifying a first encryption key and a first encryption algorithm, and (ii) a second encryption policy specifying a second encryption key and a second encryption algorithm, wherein the second encryption key and the second encryption algorithm are different from the first encryption key and the first encryption algorithm, respectively,
encrypt the first data using the first encryption key and the first encryption algorithm to generate first encrypted data according to the first encryption policy, the first encryption policy being determined based directly on a determination that the first data is associated with a first bus identification (ID) corresponding to the first module and that the first bus ID is associated directly with the first encryption policy in the lookup table, and
encrypt the second data using the second encryption key and the second encryption algorithm to generate second encrypted data according to the second encryption policy, the second encryption policy being determined based directly on a determination that the second data is associated with a second bus identification (ID) corresponding to the second module and that the second bus ID is associated directly with the second encryption policy in the lookup table.

9. The semiconductor device of claim 8, wherein the encryption module includes
   a first sub-encryption module configured to encrypt the first data using the first encryption key and the first encryption algorithm to generate the first encrypted data; and
   a second sub-encryption module configured to encrypt the second data using the second encryption key and the second encryption algorithm to generate the second encrypted data.

10. The semiconductor device of claim 8, wherein,
    the encryption module is further configured to decrypt the first encrypted data using the first encryption key and the first encryption algorithm to recover the first data, and
    the encryption module is further configured to decrypt the second encrypted data using the second encryption key and the second encryption algorithm to recover the second data.

11. The semiconductor device of claim 10, wherein the encryption module includes
    a first sub-encryption module configured to decrypt the first encrypted data using the first encryption key and the first encryption algorithm to recover the first data; and
    a second sub-encryption module configured to decrypt the second encrypted data using the second encryption key and the second encryption algorithm to recover the second data.

12. The semiconductor device of claim 8, wherein the first and second encrypted data is stored in memory external to the semiconductor device.

* * * * *